(12) United States Patent
Smith

(10) Patent No.: US 6,193,834 B1
(45) Date of Patent: Feb. 27, 2001

(54) APPARATUS AND METHOD FOR FUSION JOINING A PIPE AND FITTINGS

(75) Inventor: Cin Lee Smith, Los Altos, CA (US)

(73) Assignee: Uponor Aldyl Company, Shawnee, OK (US)

( * ) Notice: Under 35 U.S.C. 154(b), the term of this patent shall be extended for 0 days.

(21) Appl. No.: 09/117,237

(22) PCT Filed: Jan. 24, 1997

(86) PCT No.: PCT/IB97/00052

§ 371 Date: Apr. 23, 1999

§ 102(e) Date: Apr. 23, 1999

(87) PCT Pub. No.: WO97/27418

PCT Pub. Date: Jul. 31, 1997

Related U.S. Application Data

(63) Continuation-in-part of application No. 08/591,004, filed on Jan. 24, 1996, now abandoned.

(51) Int. Cl.[7] .................................................. B32B 31/26
(52) U.S. Cl. ................. 156/273.9; 156/294; 156/309.6; 219/633; 219/643; 285/21.2; 285/319; 285/921
(58) Field of Search ........................... 156/272.4, 273.9, 156/274.2, 274.4, 274.8, 275.1, 275.3, 275.7, 293, 294, 304.2, 304.3, 304.5, 308.4, 309.6; 219/607, 633, 634, 643, 535, 544; 285/21.2, 286.1, 286.2, 294.1, 921, 319

(56) References Cited

U.S. PATENT DOCUMENTS

| | | | |
|---|---|---|---|
| 3,907,625 | * 9/1975 | Vogelsanger | 285/21.2 |
| 4,436,988 | * 3/1984 | Blumenkranz | 219/544 |
| 5,254,824 | * 10/1993 | Chamberlain et al. | 156/272.4 |
| 5,338,920 | * 8/1994 | Okusaka et al. | 156/274.2 |
| 5,349,165 | * 9/1994 | Doljack | 219/633 |
| 5,352,871 | * 10/1994 | Ross et al. | 156/272.4 |
| 5,505,898 | * 4/1996 | Goto et al. | 219/535 |

FOREIGN PATENT DOCUMENTS

| | | |
|---|---|---|
| 336980 | 4/1959 | (CH) . |
| 349404 | 11/1960 | (CH) . |
| 532996 | 3/1973 | (CH) . |
| 576326 | 6/1976 | (CH) . |
| 9401411 | 5/1994 | (DE) . |
| 9302030 | 8/1994 | (DE) . |

* cited by examiner

*Primary Examiner*—Michael W. Ball
*Assistant Examiner*—Michael A Tolin
(74) *Attorney, Agent, or Firm*—Fish & Richardson PC

(57) ABSTRACT

An apparatus for fusing a pipe to a fitting includes an induction heating element wholly encased or coated with a flusible thermoplastic polymeric material, a fitting having a socket or a flange. The induction heating element is adapted to be inserted into said socket or mounted on said flange, the fitting and the element together defining a throughbore, a portion of a pipe adapted to be inserted into the throughbore or mountable on said flange. The apparatus also includes a locating and maintaining member on the induction heating element with one or more projections adapted to be snap-fitted on the fitting, the pipe or both, and capable of locating and maintaining the position of the heating element relative to the fitting or the member portion. The induction fusion element is capable of fusing the fitting and the pipe portion.

15 Claims, 6 Drawing Sheets

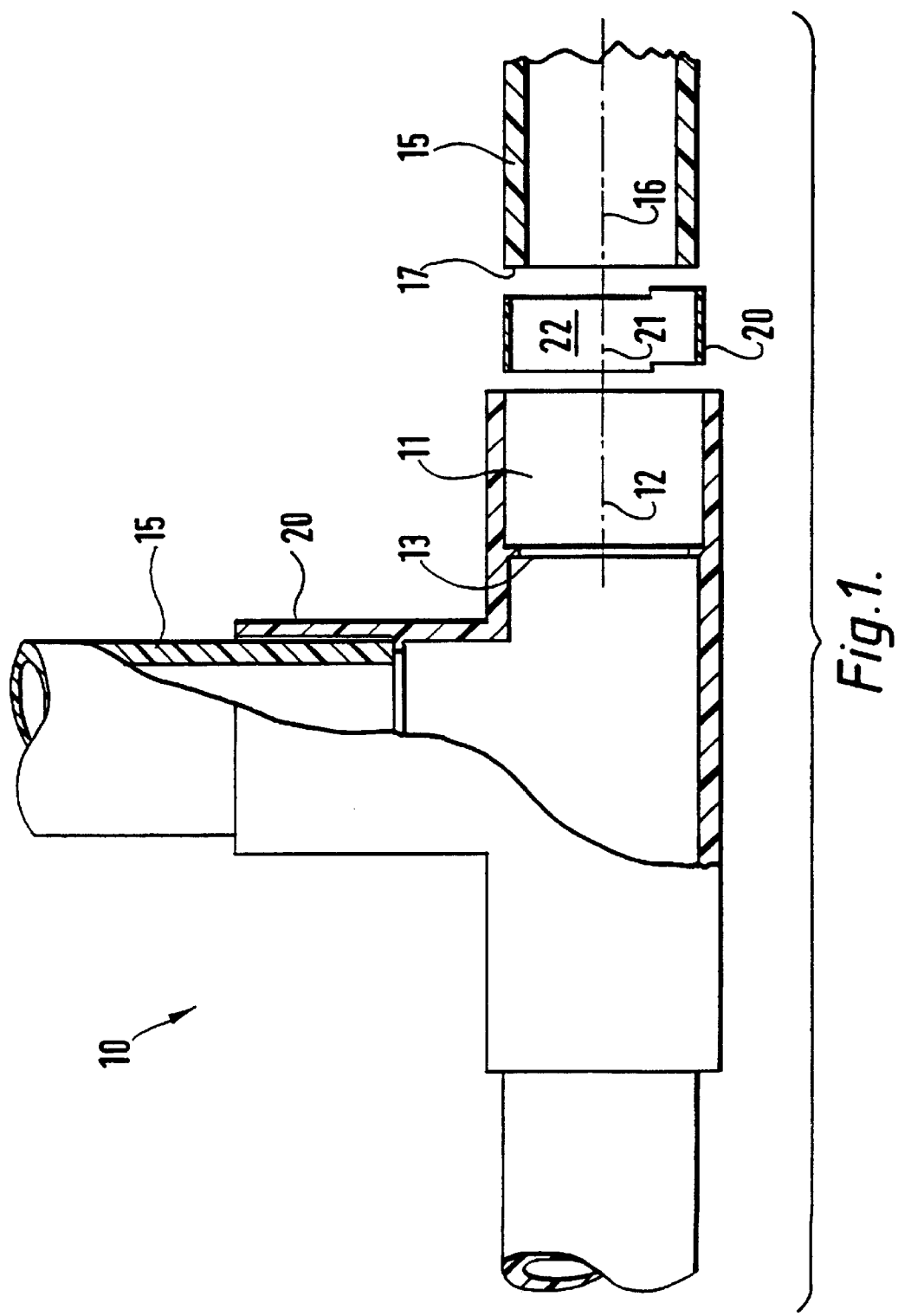

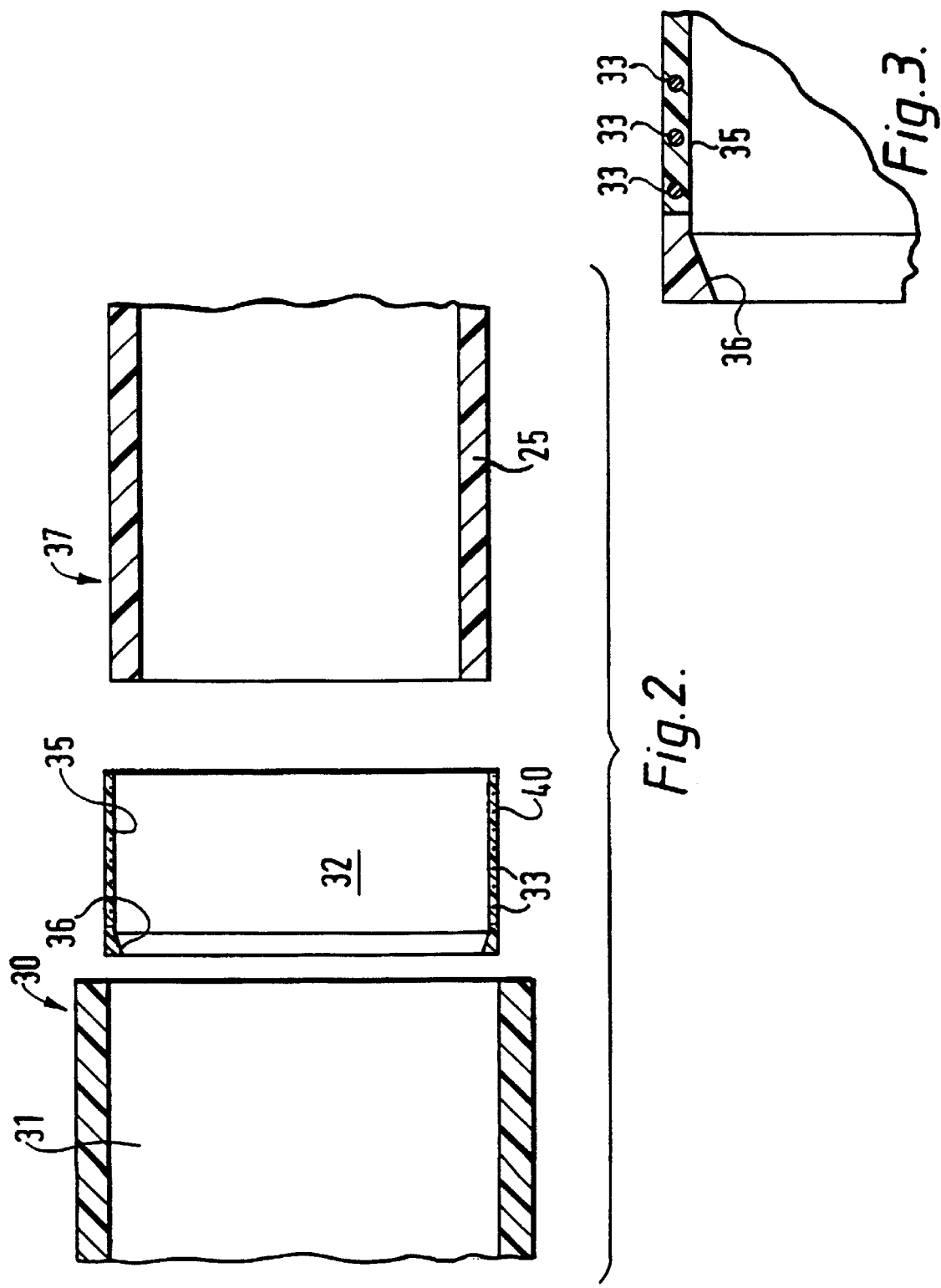

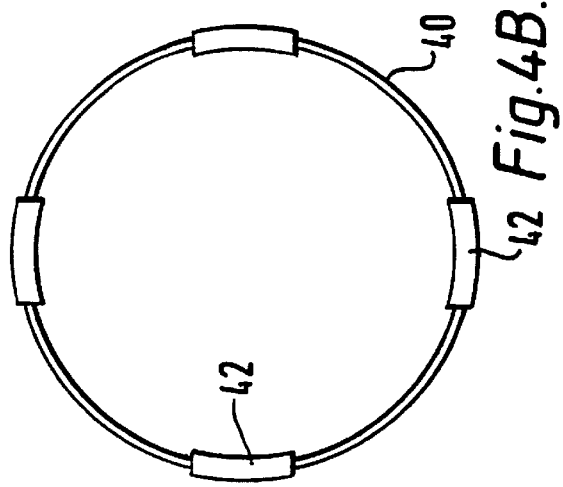
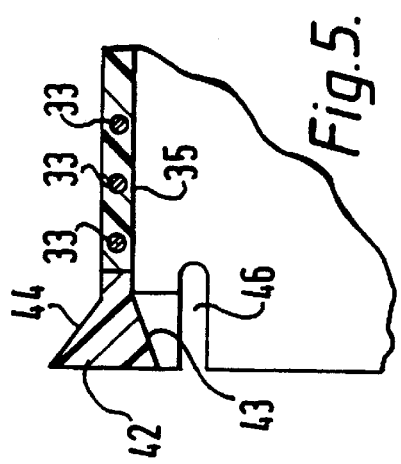
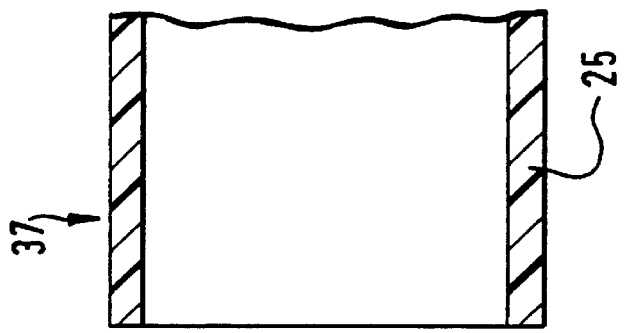
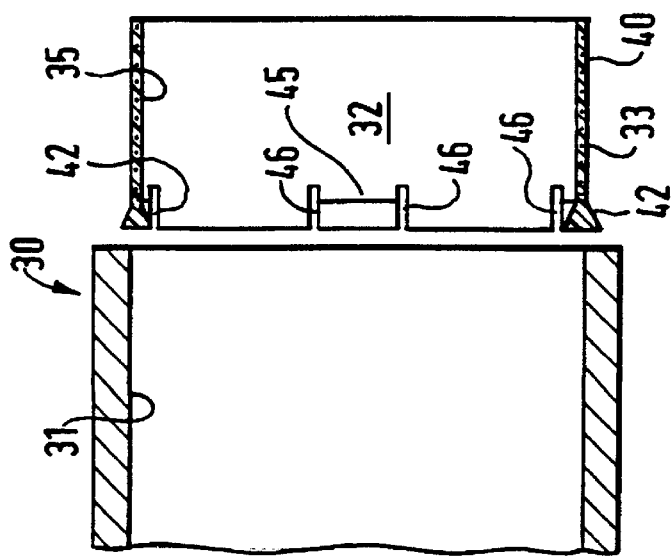

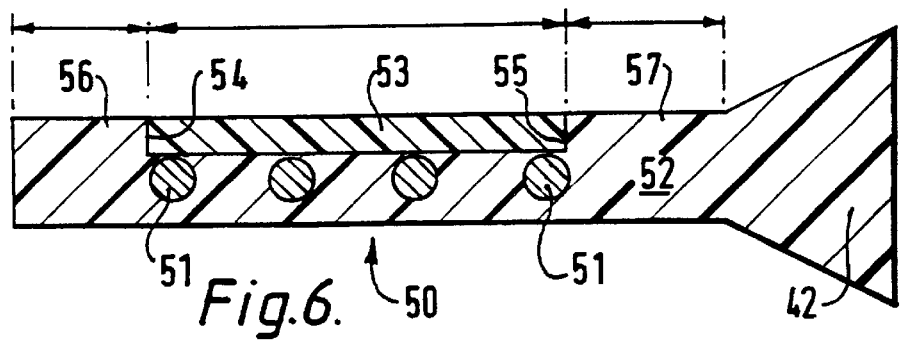
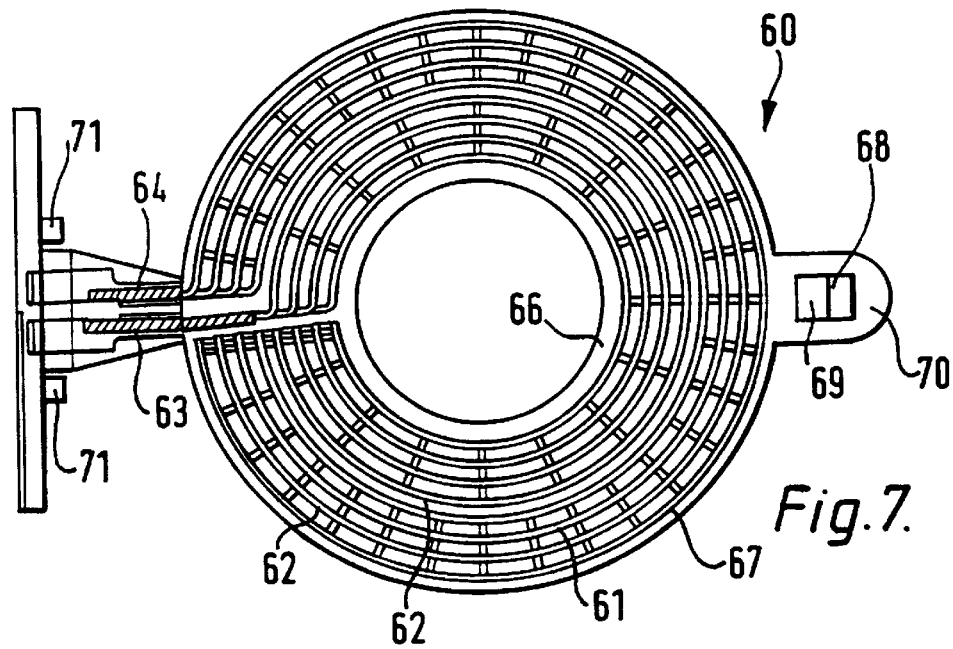
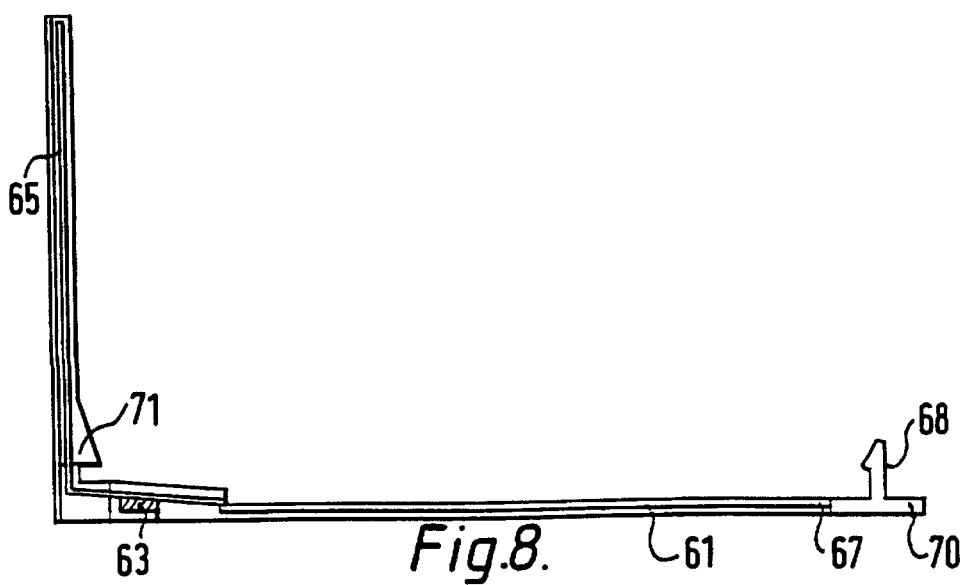

APPARATUS AND METHOD FOR FUSION JOINING A PIPE AND FITTINGS

This application is a continuation-in-part of application Ser. No. 08/591,004, filed Jan. 24, 1996, now abandoned.

BACKGROUND OF THE INVENTION

1. Field of the Invention

This invention relates to an apparatus and method for fusion joining a pipe with respect to a fitting, and more particularly to an improved apparatus and method wherein a novel heating element is insertably positioned between a fitting and a portion of the pipe.

2. Description of Prior Art

Various conventional apparatus and methods exist for fusion joining polyethylene pipes, such as those that employ heat fusion, electrofusion or induction fusion techniques. Electrofusion uses a conventional resistive heating method wherein a wire spiral coil is typically internally moulded within the thermoplastic fitting. An electrical current is applied directly to the wire coil via terminals on the fitting which results in the coil heating the thermoplastic material to a temperature which softens the thermoplastic material enough to fuse the pipe to the fitting.

In GB1149716 there is described an electrical resistance heating coil for use as a welding sleeve for joining plastics pipes to fittings wherein the pipe and fitting describe an annulus within which the welding sleeve is mounted. The coil comprises an electrical resistance wire embedded in a sheath of plastics material of precisely defined dimensions in order, it is said, to provide adequate welding efficiency. The proposed design complicates manufacture and it is difficult to connectorise the coil to an external power source. In addition, the existing wires provide potential leak paths from the joint region.

In a conventional induction fusion method for joining a pipe and a fitting, a heating element is moulded within the thermoplastic fitting. Current flow is induced through the heating element by a primary induction coil that is positioned around the portion of the fitting that contains the heating element. The temperature of the heating element is raised enough to soften or melt the fitting material and the pipe material, thereby resulting in fusion between the fitting and the pipe. Examples of induction fusion methods and apparatus are described in DE-A-2136656, EP-A-026191 and EP-A-513391. Such apparatus require a fitting with a moulded-in heating element. Thus, such methods cannot be used with existing conventional plastics fittings that do not contain a moulded-in heating element.

GB 2272663 describes a plastics pipe having an enlarged diameter portion at one end, which is provided at its inner surface or in the vicinity of its inner surface with a heating unit. A second plastics pipe to be joined is inserted into the enlarged portion and the heating unit energised. In manufacturing the pipe having the enlarged diameter portion, an end of the pipe is heated and softened, the enlarged socket formed, and the heating generating unit incorporated, in one embodiment, by pressure-inserting the heat generating unit on a core mould into the socket. The heat generating unit can be an electrofusion coil embedded in a plastics material, or a bare induction fusion element.

The electrofusion heat generating unit of GB2272663 is inconvenient, due to the necessity of providing a large flange to accommodate the terminals of the coil, difficult to overmould and expensive to manufacture. The bare induction fusion element, even when pressure inserted into the socket, is not completely surrounded by plastics material and is liable to overheat and be subject to thermal runaway. Once thermal runaway has started in one part of the element, its resistance changes dramatically and that area of the element draws in current (voltage, power) such that the rest of the element will not heat. The overheated region of the element can also cause local degradation of the thermoplastic material. In such cases usually the melt region cannot be contained, and thus a good fusion joint cannot be made.

The entire disclosures of all the above mentioned patents are incorporated herein by reference for all purposes.

It is apparent that there is a need for an apparatus and method that can be used to fuse a fitting with respect to a pipe, using induction techniques and a conventional fitting that does not contain a moulded-in heating element.

SUMMARY OF THE INVENTION

It is one object of this invention to provide an electrofusion joining apparatus and method that can be used with conventional fittings to join a pipe either directly to or with respect to a fitting or another pipe.

It is another object of this invention to provide a novel induction heating element which can be quickly and easily field-installed within a conventional thermoplastic fitting or within an electrofusion fitting from which the moulded-in heating element has been omitted.

The above and other objects of this invention are accomplished with an apparatus that employs a novel induction heating element which is insertable within a socket or mountable on a flange of a fitting.

In a first aspect, the invention provides an apparatus for fusion joining a pipe with respect to a fitting, the apparatus comprising:

an induction heating element, the element being wholly encased or coated with a fusible thermoplastic polymeric material, a fitting provided with a socket and/or a flange, the induction heating element being wholly insertable within said socket or mountable on said flange, such that the fitting and the element together define a throughbore, a portion of the pipe being insertable within the throughbore or mountable on said flange whereby the induction fusion element can, when energised, provide a fusion joint between the fitting and the said portion of the pipe.

In a second aspect, the invention provides a method for fusion joining a pipe with respect to a fitting, the method including the steps of:

providing an induction heating element, the element being wholly encased or coated with a fusible thermoplastic polymeric material, inserting the induction heating element wholly within a socket of the fitting, or mounting the induction heating element on a flange of the fitting, such that the fitting and the element together define a throughbore, inserting a portion of the pipe into the throughbore, or mounting a portion of the pipe on said flange, and energising the induction fusion element to provide a fusion joint between the fitting and the said portion of the pipe.

In a third aspect, the invention provides certain novel induction heating elements as more particularly described herein.

The induction heating element of this invention is provided with a casing or coating of a fusible thermoplastic polymeric material, which can, for example, be a polyolefin, such as polyethylene. The polymer encased or polymer coated induction heating element can be easily inserted within a socket or mounted on a flange of a conventional fitting, such as a coupling, a standard tee, a hot-tap tee, a tapping tee, another pipe, a valve or the like, such that the fitting and the element together define a throughbore. Preferably the fitting and the element each wholly surround the throughbore such that the throughbore passes through an aperture, opening a hole in each of them. A portion of the pipe to be joined can then be inserted within the throughbore or mounted on the flange. In the fusion step, the induced alternating current flowing through the conductive material of the induction heating element increases the temperature of the polymeric material to near, at or above the melting temperature, which results in fusion of the end or adjacent portion of the pipe either directly to or with respect to the fitting.

According to the invention, it is not necessary to use a conventional heat fusion fitting that has an insert-moulded heating element. In the apparatus and method of this invention, the fitting does not require a two-step method for manufacturing the fitting and the electrofusion method of this invention can be accomplished with standard, off-the-shelf thermoplastic fittings or with electrofusion fittings from which the moulded-in electrofusion element has been omitted. Because of the simplified manufacturing process associated with standard, off-the-shelf thermoplastic fittings, it is possible to reduce overall manufacturing costs while increasing the availability of differently sized fittings which can be used with the induction fusion method for joining a pipe with respect to a fitting.

In a particularly preferred embodiment of the invention, the induction heating element is wholly inserted within the socket or mounted on the flange and preferably is provided with regions of plastics material that are substantially unheated and form "cold zones" which help to contain the melt during the fusion step. Melt containment helps to build up pressure in the melt region and improves the quality of the fusion joint. The regions of plastics material forming the "cold zones" are preferably continuous and uninterrupted, that is to say, they do not have wires or conductors passing through them. The regions of plastics material can be provided as separate components, but preferably they are moulded with the plastics material encasing or wholly surrounding the induction heating element.

In a further preferred embodiment of the invention the induction heating element is provided with means for locating and maintaining its position relative to the fitting or to the pipe, or both, prior to the fusion step. Thus the element can be a simple interference fit with either the fitting or the pipe, or both. Preferably, however, the induction heating element is provided with projections which are a snap fit on either the fitting or the pipe, or both. In certain embodiments, stop means are preferably also provided in the fitting to limit the longitudinal insertion of the fitting element, and preferably also the pipe, into the fitting.

BRIEF DESCRIPTION OF THE DRAWINGS

These and other objects and features of this invention will be better understood from the following detailed description taken in conjunction with the drawings wherein:

FIG. 1 is a partial cross-sectional, partial exploded view showing an assembly relationship between a pipe, an induction heating sleeve element and a standard tee fitting, according to one preferred embodiment of this invention;

FIG. 2 is a partial cross-sectional exploded view of an induction heating sleeve element encased within a polymeric material, which is used to fusion join two pipes, according to one preferred embodiment of this invention; and FIG. 3 is an enlarged partial cross-sectional view of one end of an induction heating sleeve element, according to another preferred embodiment of this invention.

FIGS. 4(a) and 4(b) show a modification of the induction heating sleeve element of FIG. 2 wherein the snap-fit member is shaped to engage both the pipe and the fitting;

FIG. 5 shows an enlarged partial cross-sectional view of an end of the element of FIG. 4;

FIG. 6 shows a partial cross-sectional view of an induction heating sleeve element of the invention illustrating the regions provided as "cold zones";

FIGS. 7, 8 and 9 show respectively in plan view, side elevation and end elevation an induction heating cylindrical mat element according to the invention.

DESCRIPTION OF PREFERRED EMBODIMENTS

Figure 9:
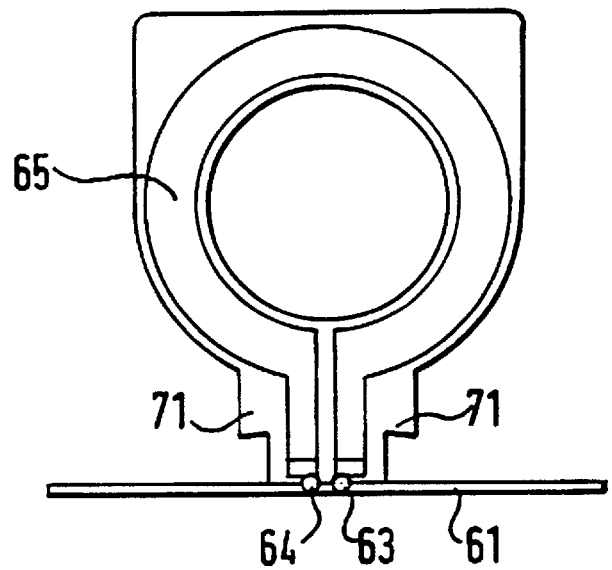

The apparatus and method according to this invention can be used to fusion join standard, off-the-shelf thermoplastic fittings either directly to or with respect to a pipe. Referring to FIG. 1, fitting 10 is shown as a standard tee. As shown in FIG. 2, fitting 30 is a standard polyethylene pipe. It is apparent that any suitable fitting known to those skilled in the art, which in this case has a socket end, can be used as fitting 10, according to preferred embodiments of this invention. As used throughout this specification and in the claims the word fitting is intended to relate to any coupling member or other suitable fitting that forms a socket or a flange for joining with a pipe or similar member.

The vertically oriented pipe 15, as shown in FIG. 1, is mounted within socket 11 of fitting 10. In such mounted position, induction heating sleeve element 20 is sandwiched between pipe 15 and fitting 10.

The exploded view portion of FIG. 1, in the horizontally oriented direction on the right-hand side, shows the physical relationship between fitting 10, induction heating sleeve element 20 and pipe 15. Induction heating sleeve element 20 is insertable within socket 11 of fitting 10. In a mounted position of sleeve element 20 within socket 11, sleeve element 20 is longitudinally positioned completely within socket 11. Mounting sleeve element 20 completely within socket 11 provides for cold zones, surrounding the ends of sleeve induction heating element 20, which are very important for forming a gas-tight seal where pipe 15 joins fitting 10. This is illustrated in greater detail in FIG. 6. Mounting sleeve element 20 completely within socket 11 also eliminates any safety danger associated with undesirable contact of sleeve element 20 and prevents any leak paths from arising.

As shown in FIG. 1, peripheral shoulder 13 or another suitable stop means is used to limit longitudinal insertion of induction heating sleeve element 20 within socket 11. Particularly with a tee fitting, it is desirable to limit longitudinal insertion of induction heating sleeve element 20 for purposes of reducing flow interference through branches of fitting 10, and to ensure that the induction heating sleeve element is correctly positioned to provide the necessary cold zones 30, 31 as shown in FIG. 6. This is another important aspect of the invention.

End portion 17 of pipe 15 is insertable within throughbore 22 of induction heating sleeve element 20. Stop means are preferably used to limit longitudinal insertion of end portion 17 within throughbore 22 of sleeve induction heating element 20. In one preferred embodiment according to this invention, peripheral shoulder 13 may also be sized large enough to limit longitudinal insertion of pipe 15 within induction heating sleeve element 20 and thus within socket 11. According to another preferred embodiment of this invention as shown in FIGS. 2 and 3, internal surface 35 of induction heating sleeve element 40 comprises internal collet 36 or another reduced diameter section of internal surface 35. The reduced diameter section has an inside diameter less than a maximum pipe outer diameter of end portion 37, so that internal surface 35 interferes with the external surface of pipe 25 and thus limits longitudinal insertion of pipe 25 within throughbore 32.

As shown by both the horizontally and vertically oriented pipes 15 in FIG. 1, longitudinal axis 12 of fitting 10 is generally aligned with longitudinal axis 16 of pipe 15 which is generally aligned with longitudinal axis 21 of sleeve induction heating element 20, when such components are assembled in a mounted position prior to fusion or when such components are fused together. The cross sections of socket 11, pipe 15 and sleeve induction heating element 20 are preferably generally circular, within tolerances customary to the polyethylene pipe and fitting industry. However, such cross sections can also be non-circular shapes, such as squares, polygons, ovals or the like, and still accomplish the same result of this invention.

According to the invention, as shown in FIG. 3, conductive material 33 of induction heating sleeve element 40 is either encased within or coated by a polymeric material, such as polyethylene. Conductive material 33 of sleeve element 40 may also comprise conductive particles, such as a magnetic alloy powder, which is mixed within the same or a compatible polymeric material to that of the body of fitting 30 to form a general sleeve shape. U.S. Pat. No. 5,462,314, the entire disclosure of which is incorporated into this specification by reference for all purposes, discloses an electrofusion fitting having a similar sleeve integrally moulded within the fitting. Conductive material 33, the heating element portion of induction heating sleeve element 40, may comprise any one or combination of a preformed conductive wire, a conductive solid having a tubular shape, a conductive grid having a tubular shape or any other suitable shape apparent to those skilled in the art. Suitable shapes for the induction heating element are also described, for example, in GB 2272643 and in EP-A-572546.

Encasing or coating sleeve heating elements 20, 40 with a polymeric material reduces corrosion to conductive material 23, 33 such as prior to fusion, and also reduces surface friction, burrs and/or sharp edged associated with conductive materials 23, 33. Referring again to FIG. 1, when encased or coated with a polymeric material, depending upon the particular design and dimensions, the material of fitting 10 may fuse directly with the outer surface material of sleeve induction heating element 20 and the material of pipe 15 may fuse directly with the inner surface material of sleeve induction heating element 20. Thus fitting 10 can possibly be fused and thus fixed with respect to pipe 15 rather than directly to pipe 15. It is also possible to select the design and dimensions of sleeve induction heating element 20 so that at least a portion of the material of fitting 10 fuses directly to the material of pipe 15.

Any suitable method can be used for manufacturing the sleeve induction heating element of the invention. However, in a particularly preferred method according to the invention, the conductive material of the sleeve induction heating element, which may comprise a coil, cage, or other suitable shape of conductive material, is overmoulded with a suitable thermoplastic polymeric material. It is particularly preferred to use a cage of conductive material, since this allows the conductive material cage to be made separately and then overmoulded with a thin layer (preferably from 1.0 to 10.0 mm) of thermoplastic polymeric material. The thermoplastic material is preferably polyethylene, although other polyolefins, and other thermoplastic polymers, may also be used.

In one preferred embodiment according to this invention, induction heating sleeve elements 20, 40 can be manufactured or modified to enhance the mechanical grip between induction heating sleeve element 20, 40 and pipes 15, 25 and/or fittings 10, 30. The components can be a simple interference fit, but preferably mechanical snap-fits, mechanical press-fits, heat stakes, barbs, ultrasonic welds, or any other suitable gripping means are used so that the extracting resistance exceeds the insertion resistance. Thus, during temporary positioning such as prior to inducing the alternating current within conductive materials 23, 30 fittings 10, 30 sleeve induction heating elements 20, 40 and pipes 15, 25 can be temporarily held together.

In particularly preferred embodiments, the sleeve induction heating sleeve element is a snap-fit within the fitting, or the pipe is a snap-fit within the sleeve induction heating element, or both. This is particularly advantageous when the invention is applied to a tee coupling, for example, a tapping tee, as will be more particularly described hereinafter wherein it is otherwise quite difficult to hold the components in the correct position prior to energising the induction heating element in the fusion step.

It is a common and conventional practice to shave or otherwise remove an outer layer of material of pipe 15, 25 prior to forming a fusion joint. Thus, the outside diameter of end portions 17, 37 can be reduced to a dimension which is small enough to allow end portions 17, 37 to fit within throughbores 22, 32 of induction heating sleeve elements 20, 40. In certain preferred embodiments according to this invention it is advantageous, but not necessary, to have a relatively lesser wall thickness of induction heating sleeve elements 20, 40 in order to maximize the outside diameter and the structural strength of end portions 17, 37 of pipes 15, 25.

According to one preferred embodiment of the method of this invention, for example, the method for fusion joining pipe 15 with respect to fitting 10 includes inserting sleeve induction heating element 20 within socket 11 of fitting 10, inserting end portion 17 of pipe 15 within throughbore 22 of sleeve heating element 20, and inducing current flow through conductive material 23 of sleeve induction heating element 20. Although sleeve induction heating element 20 is preferably inserted within socket 11 before inserting end portion 17 of pipe 15 within throughbore 22, it is apparent that end portion 17 can be inserted within throughbore 22 prior to inserting sleeve induction heating element 20 within socket 11. A similar method can be applied to the embodiment of FIGS. 2 and 3. The particular order of method steps is not essential to achieving a properly fused joint, which allows use of the method and apparatus of this invention in many different pipe and fitting arrangements. In another preferred embodiment of the invention, the induction heating element can be factory installed in the fitting prior to shipping the fitting to the customer. Such installation can comprise, for example, fusing the induction heating element to the fitting by energising the induction heat element in a first heating step. Such fusion can ensure, with proper factory control, that the sleeve induction heating element is fused to the fitting in a gas tight fashion.

Current flow through conductive material 23 can, for example, be generated by inducing an alternating current in a primary coil which is positioned about or around sleeve heating element 20. Suitable induction generators and other suitable induction methods and apparatus for inducing alternating current are known to those skilled in the art, for example, as disclosed in EP-A-566316 and EP-A-566317 the entire disclosures of which are incorporated herein by reference for all purposes. In a preferred method according to the invention, the induction generator comprises a high frequency generator as described in EP-A-566316.

Polymeric materials for fittings 10, 30, pipes 15, 25 and the casing or coating applied to conductive materials 23, 33 are well known to those skilled in the art and any suitable material can be used in combination with or in lieu of polyethylene. The polyethylene, or other polymeric materials, can be wholly or partly cross-linked, provided that sufficient fusible polymeric material is available to form a fusion joint. Also, materials and configurations for conductive materials 23, 33 are well known to those skilled in the art and can be interchanged without departing from the results desired and achieved according to the apparatus and method of this invention.

Referring now to FIGS. 4(*a*) and (*b*), and FIG. 5 there is illustrated an embodiment similar to that depicted in FIGS. 2 and 3, and the same numerals are used for identical features. In the embodiment of FIGS. 4(*a*) and (*b*) and FIG. 5, the internal collet 36 is replaced by wedge-shaped regions 42, which are peripherally spaced around the circumference of the sleeve element 40 as shown in FIG. 4(*b*).

The wedge-shaped regions have bearing surfaces 43, 44 which are respectively a snap-fit on the external surface 37 of pipe 25, and the internal surface 31 of pipe 30. The wedge-shaped regions 42 are formed on resilient tongues 45 bordered by slots 46.

FIG. 6 shows a partial cross-section through an induction heating sleeve element 50, which comprises with an induction heating conductive cage 51, wholly encased within a fusible thermoplastic polymeric material 52. The polymeric material extends at least 2.54 mm, and preferably at least 3.81 mm to the left and right sides of the cage 51 as illustrated in FIG. 6. On the right side the polymeric material is formed into wedge-shaped regions 42 in order for the sleeve element to be a snap-fit in the fitting and on the pipe, as previously explained. The melt region, comprising fused polymeric material, is shown diagrammatically at 53. When the induction heating cage is energised, the fused polymeric material expands and fills the melt region. However, further expansion is prevented by the shoulders 54, 55 of the cold zones 56, 57, formed by the extra polymeric material encasing the cage 51. These provide a barrier to longitudinal melt flow and enable pressure to build up in the melt region 53 and improve the fusion bond.

Whilst the embodiments hitherto described utilise an induction heating sleeve element, the embodiment of FIGS. 7 to 11 illustrates the use of an induction heating element comprising a flat disc or cylindrical mat. Referring firstly to FIGS. 7 and 8, the induction heating element 60 comprises a flat induction heating cage 61 which comprises sets of conductive wires 62 which are linked together and connected to terminals 63, 64.

The terminals are in turn connected to an upstanding induction loop 65 as best seen in FIG. 9. The entire heating element is encased in a fusible thermoplastic polymeric material which is formed into "cold zone" regions 66, 67 around the inner and outer circumferences of the heating element, and into snap-fit projects, the first 68, mounted on a resilient tongue 69 on a tab 70, and the second pair, 71, mounted on the upstanding induction loop 65.

Figure 10:
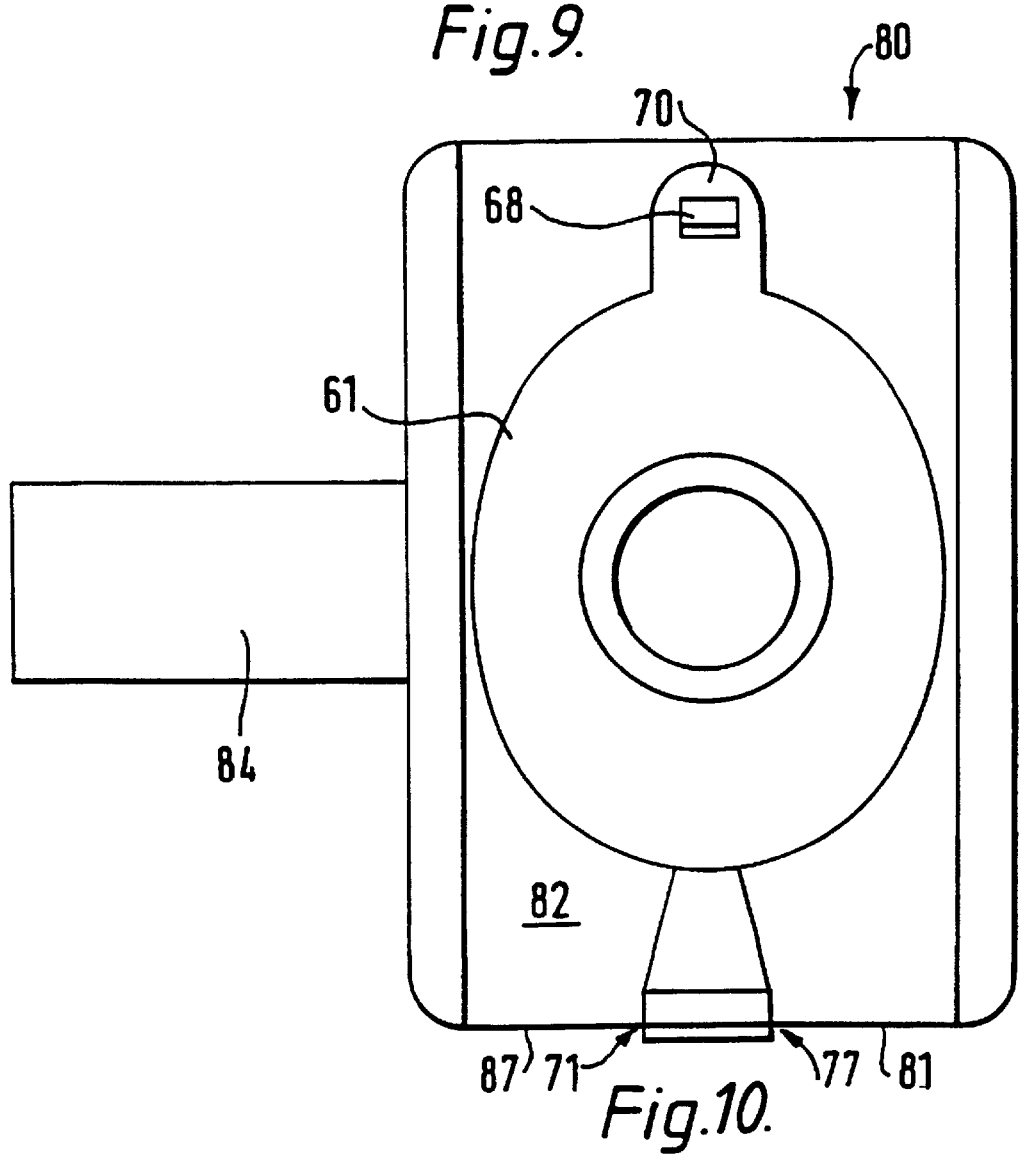
FIGS. 10 and 11 show respectively a view from below and a perspective view from one side of a tapping tee fitting provided with an induction heating cylindrical mat element according to the invention.
Figure 11:
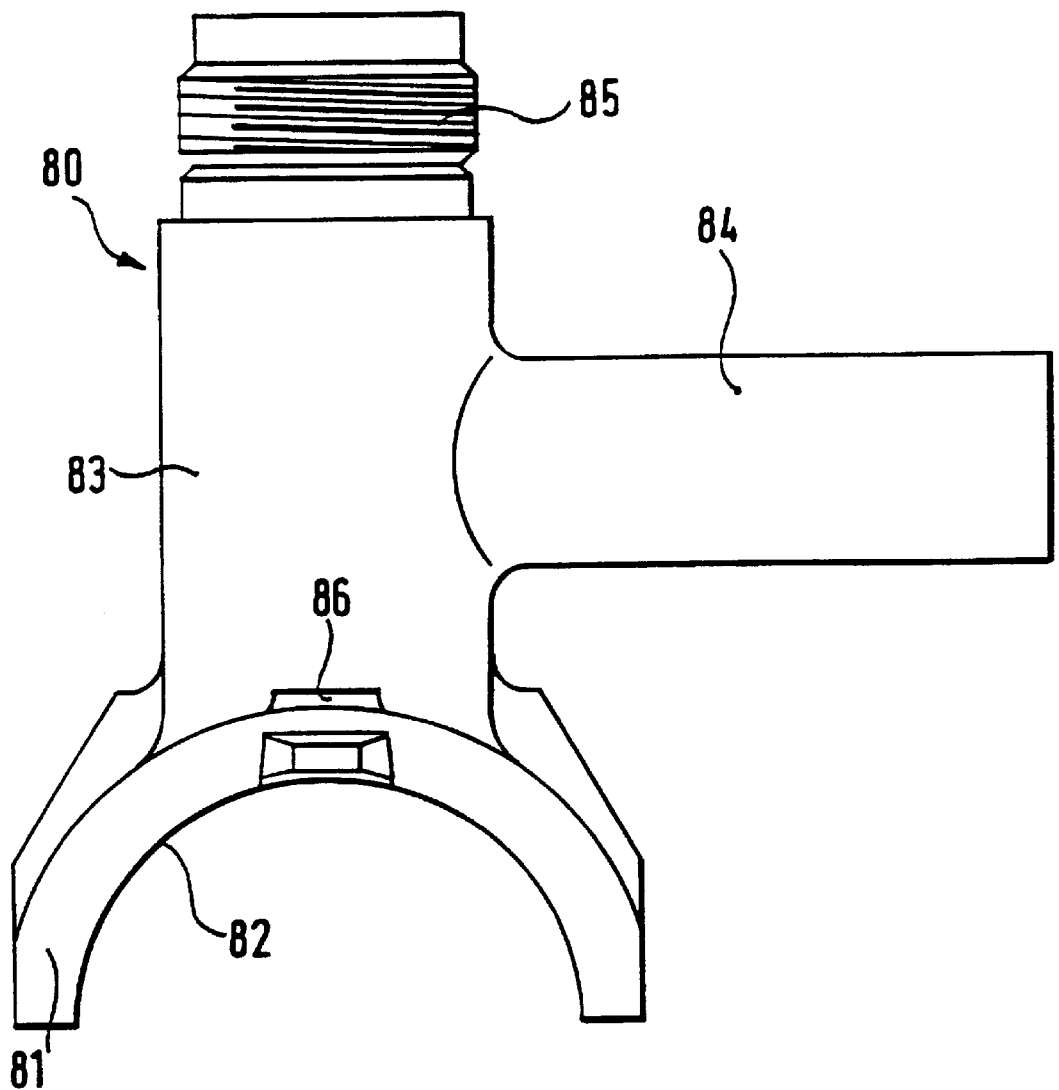

FIGS. 10 and 11 illustrate the use of the induction heating element of FIGS. 7 to 9 with a tapping tee fitting. The fitting, illustrated generally at 80, is provided with a saddle region 81, having an internal surface 82 adapted to be fused to a pipe surface, an upstanding hollow body 83, and a branch pipe 84. At the top of the body 83 is a threaded cap 85 which may incorporate a threaded cutter which can be screwed down through the body 83 in order to cut a hole in the pipe body (not shown). The fitting also has a recess 86 which can accommodate the first snap-fit projection 68, and an opposed edge 87 around which the projections 71 can be located.

The assembly of the fitting and the induction heating element is best seen in FIG. 10, where the cage 61 is illustrated in position mounted on the underside of the fitting 80. The cage is sufficiently flexible to follow the contour of the internal surface 82 of the saddle 81, and is held in position by the snap-fit projections 68 and 71 prior to fusion. In operation, an alternating current is induced in the induction loop 65 and flows through the induction heating cage 61, melting or softening the surrounding thermoplastic plastics material and forming a fusion joint between the saddle region 81 and the pipe surface.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for fusing a pipe to a fitting, comprising:
   inserting an induction heating element within a socket of a fitting or mounting the induction heating element on a flange of the fitting, the fitting and the element together defining a throughbore, inserting a portion of the pipe into the throughbore or mounting a portion of the pipe on said flange, locating and maintaining the heating element in or on the fitting or pipe respectively by one or more snapfit projections on the fitting, the pipe or both, and energizing the induction fusion element.

2. The method of claim 1 further comprising removing an external layer of material at the pipe and induction heating element interface prior to contact.

3. An apparatus for fusing a pipe to a fitting, comprising:

an induction heating element wholly encased or coated with a fusible thermoplastic polymeric material, fitting having a socket or a flange, wherein the induction heating element is adapted to be inserted into said socket or mounted on said flange, the fitting and the element together defining a throughbore, a portion of a pipe adapted to be inserted into the throughbore or mountable on said flange; and, a locating and maintaining member on the induction heating element comprising one or more projections adapted to be snap-fitted on the fitting, the pipe or both, and capable of locating and maintaining the position of the heating element relative to the fitting or the pipe portion, wherein the induction fusion element is capable of fusing the fitting and the pipe portion.

4. The apparatus of claim 3 wherein said induction heating element comprises a sleeve.

5. The apparatus of claim 3 wherein said induction heating element comprises a cylindrical mat.

6. The apparatus of claim 3 wherein said induction heating element comprises pre-formed conductive wire.

7. The apparatus of claim 3 wherein said induction heating element comprises a polymeric body carrying conductive particles.

8. The apparatus of claim 4 wherein the fitting includes stop means for limiting longitudinal insertion of said induction heating sleeve element within said fitting.

9. The apparatus of claim 3 wherein the fitting further comprises stop means for limiting longitudinal insertion of said pipe portion into said throughbore.

10. The apparatus of claim 9 wherein said stop means comprises an internal collet located on an internal surface of said induction heating element.

11. The apparatus of claim 3 wherein the induction heating element includes substantially non-conducting plastics material forming cold zones to contain the melt during the fusion step.

12. The apparatus of claim 11 wherein said non-conducting plastics material is molded with the fusible thermoplastic polymeric material.

13. The apparatus of claim 3 wherein said heating element comprises an induction heating cage in series with an induction loop externally mounted on said fitting.

14. The apparatus of claim 13 wherein the heating cage is flat.

15. The apparatus of claim 14 further comprising snap-fit projections formed on the heating element.

* * * * *